United States Patent
Chiang et al.

(10) Patent No.: US 6,899,402 B2
(45) Date of Patent: May 31, 2005

(54) COMBINATION OF CRANK AND AXLE IN BOTTOM BRACKET

(75) Inventors: Douglas Chiang, Dali (TW); Douglas Mathew Stuart, Dali (TW)

(73) Assignee: Tien Hsin Industries Co., LTD, Tali (TW)

( * ) Notice: Subject to any disclaimer, the term of this patent is extended or adjusted under 35 U.S.C. 154(b) by 0 days.

(21) Appl. No.: 10/642,986

(22) Filed: Aug. 18, 2003

(65) Prior Publication Data
US 2005/0040699 A1 Feb. 24, 2005

(51) Int. Cl.[7] ............................................. B60B 35/00
(52) U.S. Cl. .................. 301/124.2; 280/259; 74/594.1
(58) Field of Search ...................... 301/124.2, 105.1, 301/109, 110.5, 128; 280/259, 260; 74/594.1, 74/551.9

(56) References Cited

U.S. PATENT DOCUMENTS

| | | | |
|---|---|---|---|
| 626,227 A | * 6/1899 | Gaylor | 403/287 |
| 3,789,696 A | * 2/1974 | Beam, III | 74/594.1 |
| 4,150,859 A | * 4/1979 | Segawa et al. | 384/458 |
| 4,171,882 A | * 10/1979 | Johnson, III et al. | 353/1 |
| 4,630,503 A | * 12/1986 | Liu | 74/594.2 |
| 6,003,889 A | * 12/1999 | Shalom | 280/259 |
| 6,755,095 B2 | * 6/2004 | Yamanaka | 74/594.1 |

* cited by examiner

Primary Examiner—Frantz F. Jules

(57) ABSTRACT

A crank includes a through hole defined in a first end thereof for receiving one of two ends of an axle in the bottom bracket, and a threaded hole defined in a second end of the crank so as to be connected with a pedal. A passage is defined through the crank and communicates with the through hole. A positioning assembly is received in the passage and includes two tubular members which are pulled toward each other by a bolt threadedly extending through the two tubular members. A concave surface is defined in each of the two tubular members so that the axle is pressed in position by the concave surfaces of the two tubular members.

4 Claims, 6 Drawing Sheets

COMBINATION OF CRANK AND AXLE IN BOTTOM BRACKET

FIELD OF THE INVENTION

The present invention relates to a crank having a hole for being connected to an end of an axle in bottom bracket. At least one positioning assembly is received in the crank and contacts against the axle.

BACKGROUND OF THE INVENTION

A conventional bicycle crank includes a hole in one end for being connected with a pedal and the other hole in the other end of the crank so as to be connected to an axle of bottom bracket. The hole for being connected to the axle includes ridges and grooves in an inner periphery thereof and each of two ends of the axle has ridges and grooves on an outer periphery thereof so that the axle is co-rotated with the rotation of the crank. Nevertheless, there are gaps between the ridges of the crank and the axle so that the ridges of the crank impact ridges of the axle when the rider starts to rotate the crank. This not only produces noise during operation, but also accelerates wearing between the ridges. The larger the gaps are, the sooner that the crank disengages from the axle.

The present invention intends to provide a connection for the cranks to the axle wherein at least one positioning assembly is used to improves the connection between the axle and the crank.

SUMMARY OF THE INVENTION

In accordance with one aspect of the present invention, there is provided a combination of a crank and an axle. The crank includes a through hole defined in a first end thereof and a threaded hole is defined in a second end of the crank. An axle received in a bottom bracket has one end thereof engaged with the through hole of the crank. A passage is defined through the crank and communicates with the through hole. A positioning assembly is received in the passage and contacts the axle in the through hole.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
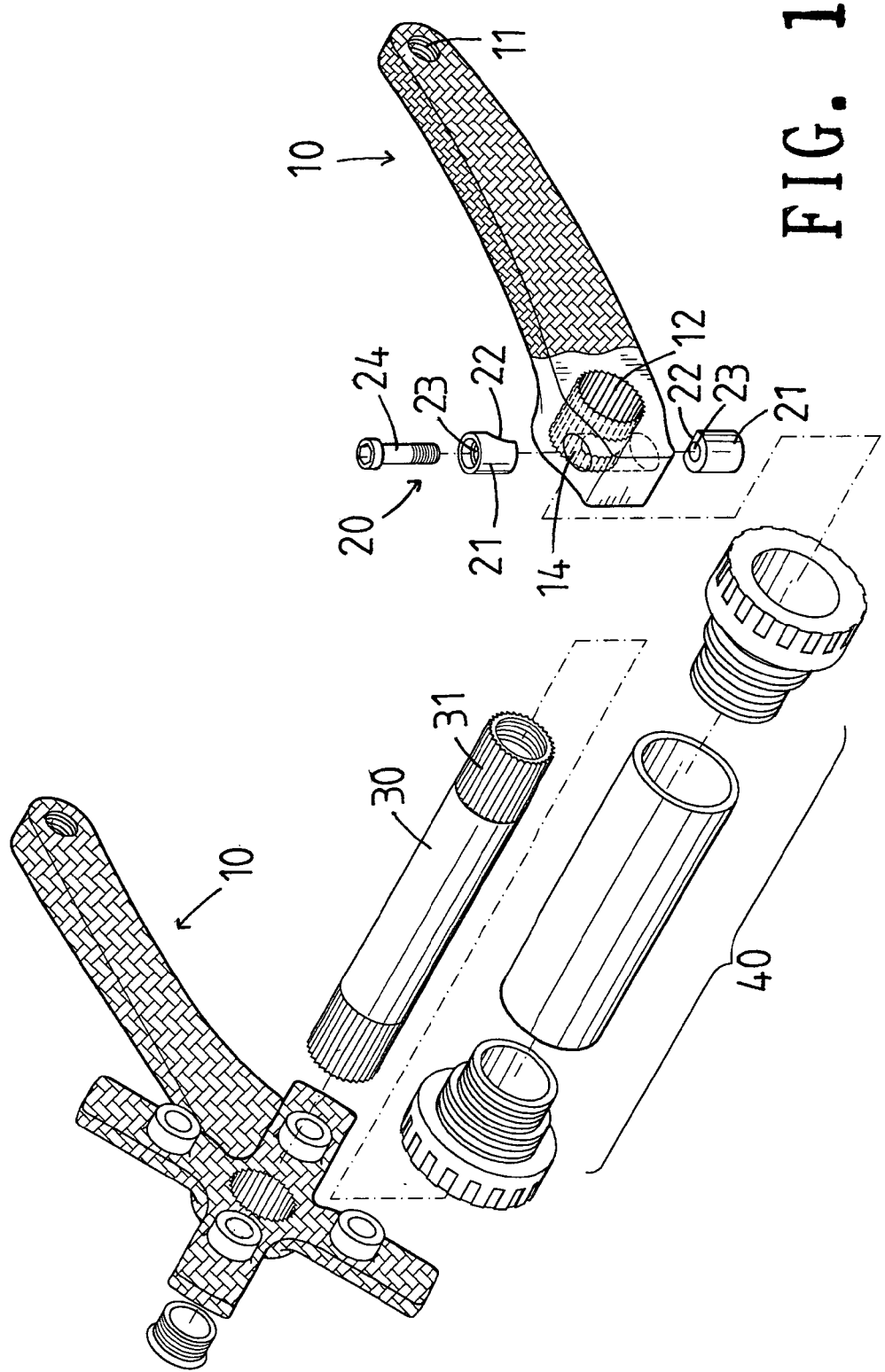
FIG. 1 is an exploded view to show the combination of the crank and the axle of the present invention.
Figure 2:
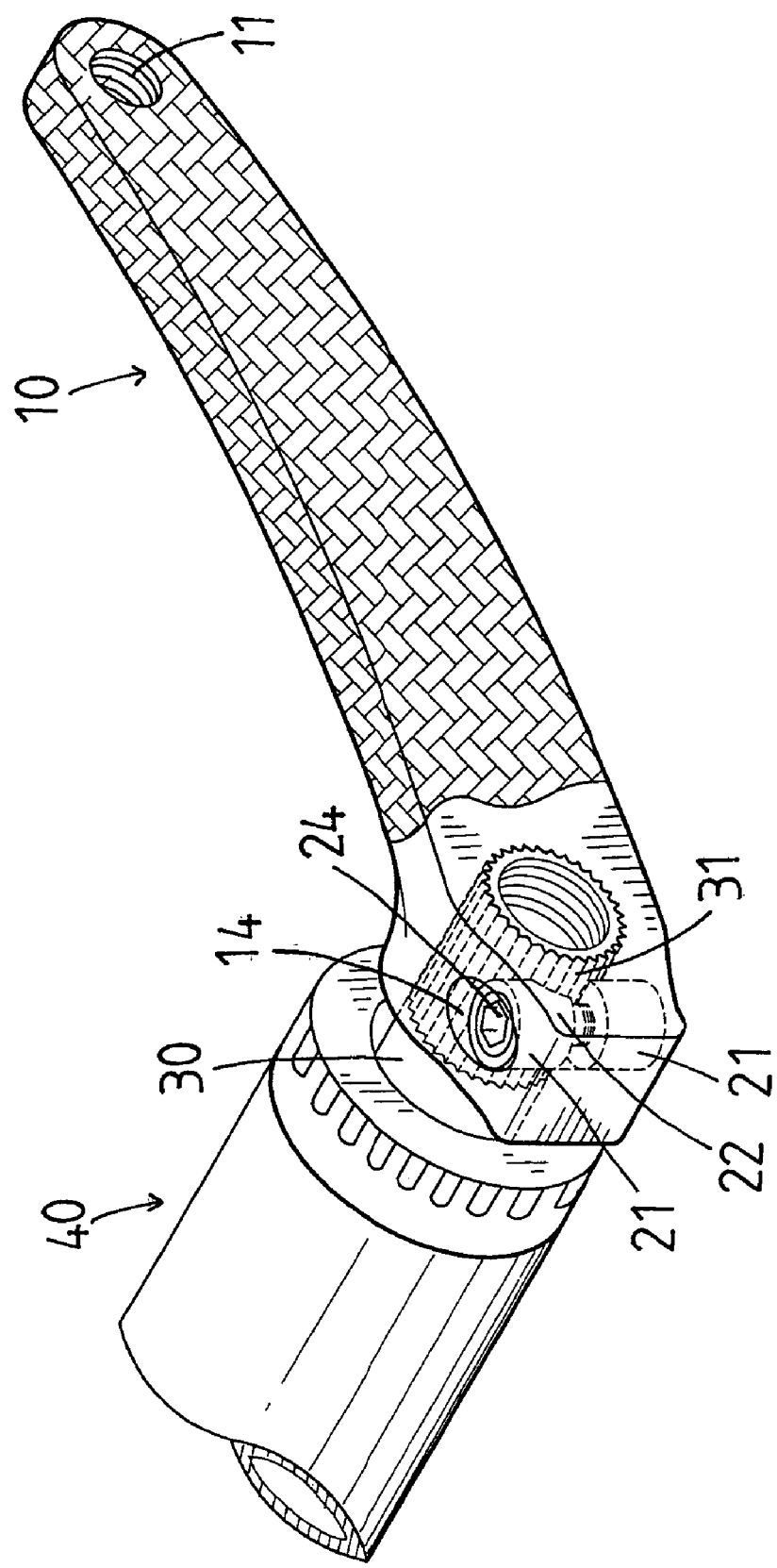
FIG. 2 is a perspective view to show the positioning assembly positions the axle of the present invention.
Figure 3:
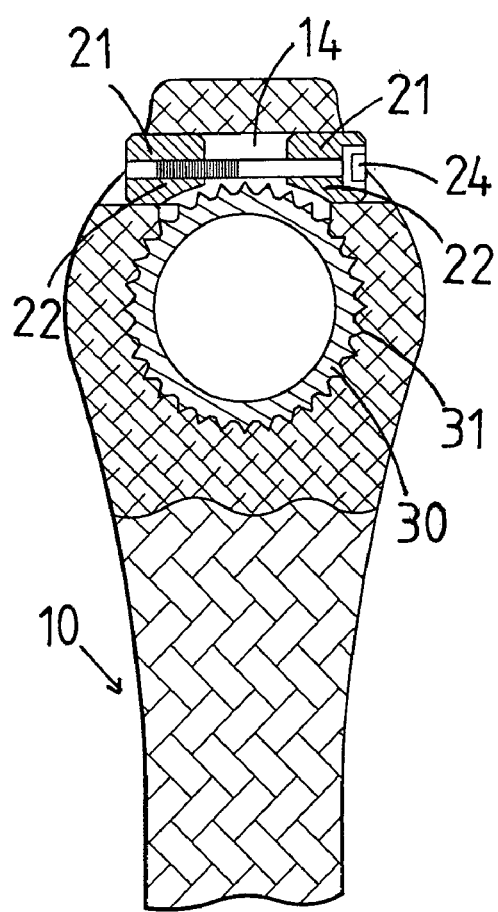
FIG. 3 is a cross sectional view to show the bolt of the positioning assembly is not yet locked to pull the two tubular members toward each other.
Figure 4:
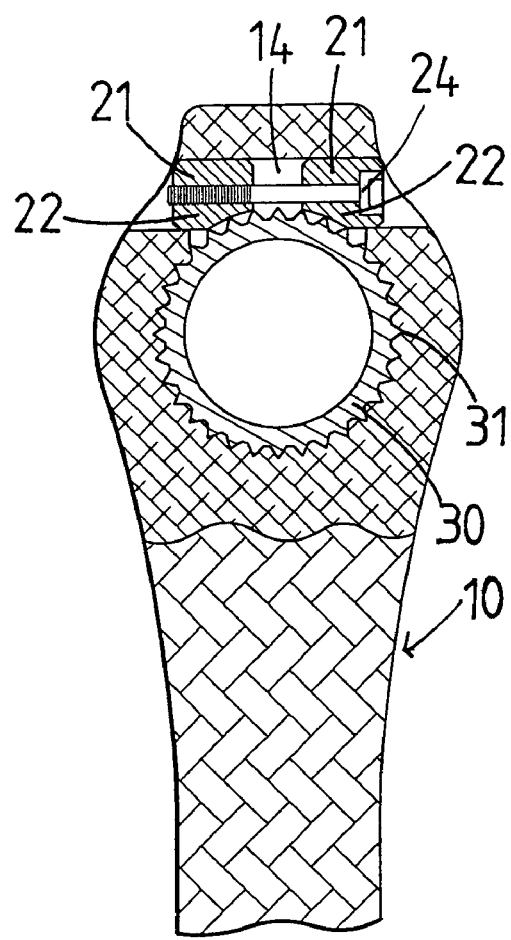
FIG. 4 is a cross sectional view to show the bolt of the positioning assembly is locked to pull the two tubular members toward each other.
Figure 5:
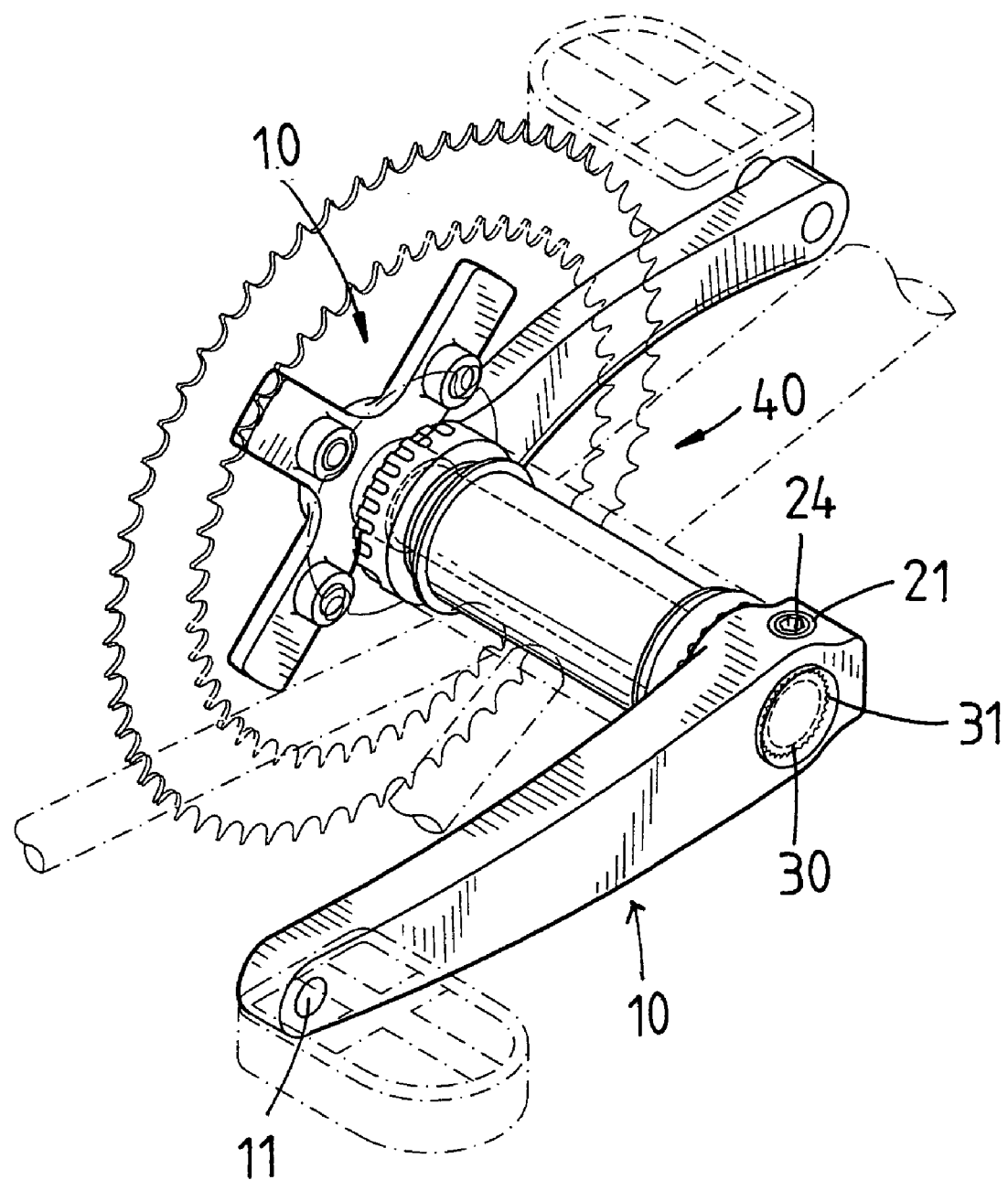
FIG. 5 shows the cranks with a pedal at one end and the other of the crank is connected to the axle.

Referring to FIGS. 1, 2, 3 and 5, the crank 10 of the present invention comprises a through hole 12 defined in a first end thereof and a threaded hole 11 is defined in a second end of the crank 10. A pedal as shown in FIG. 5 is connected to the threaded hole 11. A passage 14 is defined through the crank 10 and communicates with the through hole 12. The through hole 12 includes ridges and grooves defined in an inner periphery thereof.

The axle 30 is received in a bottom bracket 40 and each one of two ends 31 of the axle 30 includes ridges and grooves in an outer periphery thereof. The two ends 31 of the axle 30 are respectively engaged with the through holes 12 of two cranks 10 so that the axle 30 is co-rotated with the rotation of the cranks 10.

A positioning assembly 20 is received in the passage 14 of the crank 10 and includes two tubular members 21 which are respectively received in the passage 14. Each tubular member 21 has a concave surface 22 which contacts the end 31 of the axle 30. A bolt 24 threadedly extends through two respectively holes 23 in the two tubular members 21 so that when fastening the bolt 24, the two tubular members 21 are pulled toward each other and the curve surfaces 22 firmly contact the end 31 of the axle 30. The positioning assembly 20 ensures the end 31 of the axle 30 is firmly connected to the crank 10 so that no relative movement between the two items.

Figure 6:
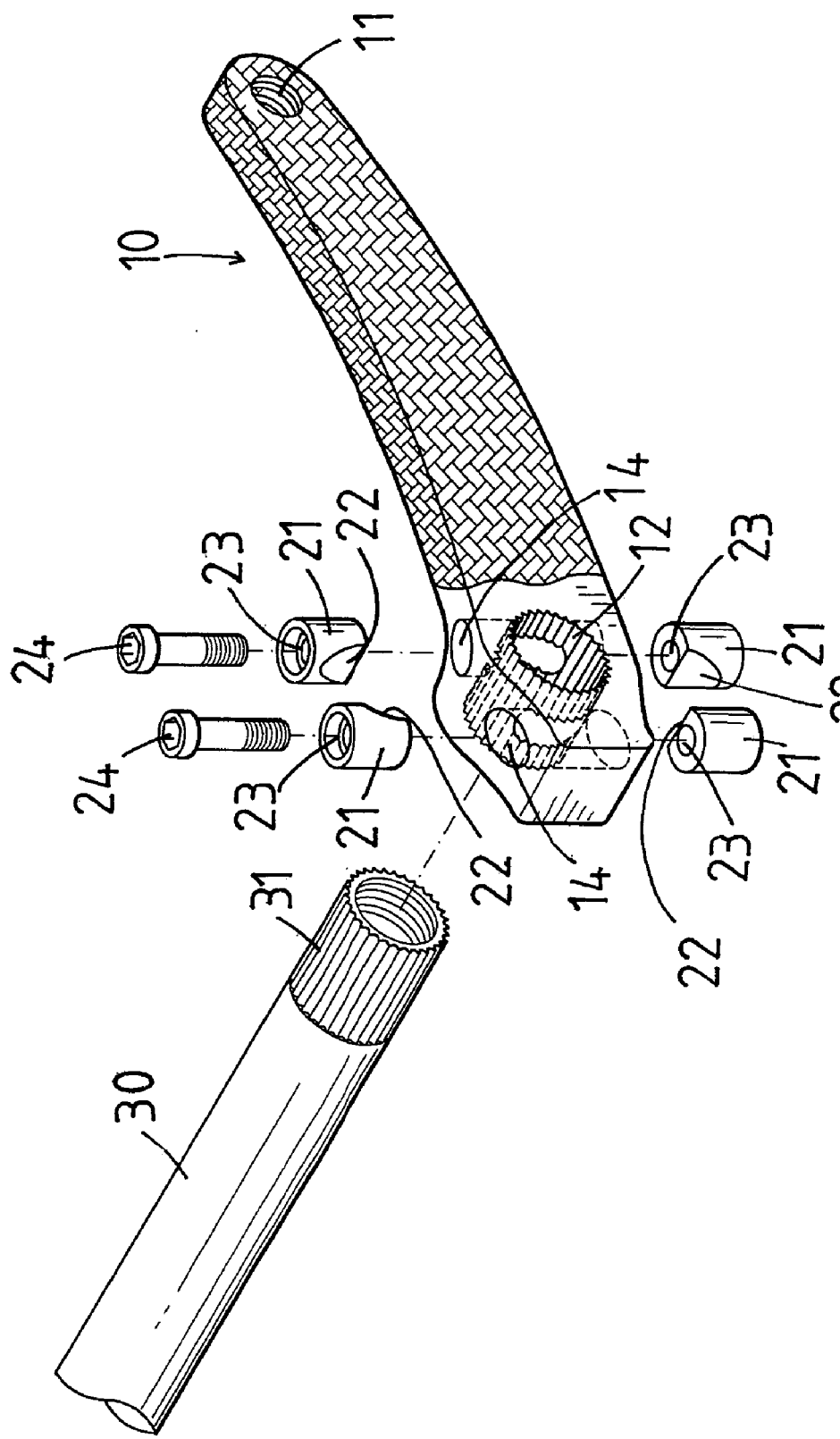
FIG. 6 is an exploded view to show another embodiment of the combination of the crank and the axle of the present invention, wherein two sets of positioning assembly are used.
Figure 7:
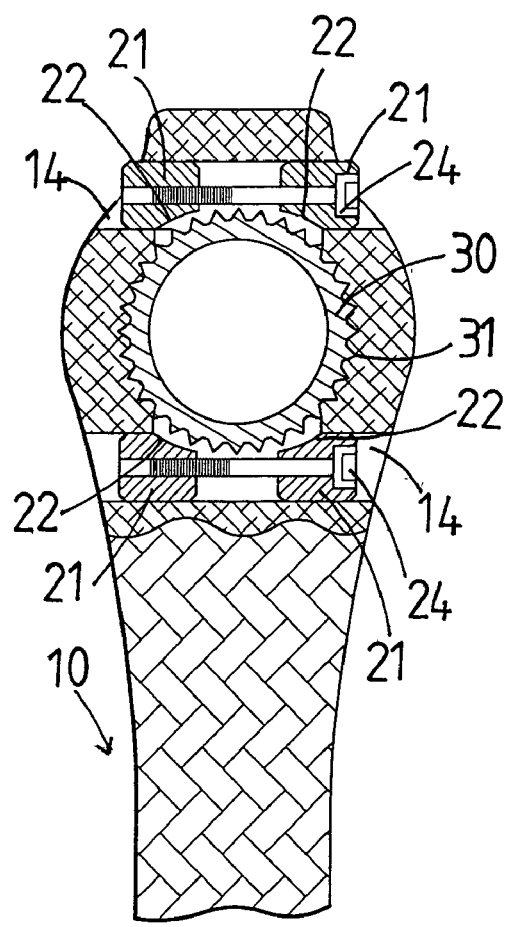
FIG. 7 is a cross sectional view to show that the bolt of each of the two sets of positioning assembly is not yet locked to pull the two tubular members toward each other.
Figure 8:
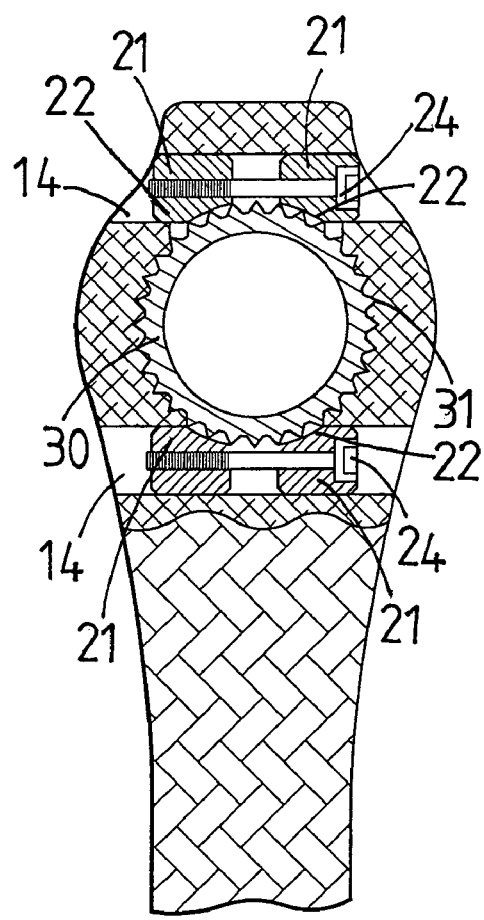
FIG. 8 is a cross sectional view to show that the bolt of each of the two sets of positioning assembly is locked to pull the two tubular members toward each other.

Referring to FIGS. 6–8, there may include tow sets of positioning assembly 20 in each crank 10. Two passages 14 are defined through the crank 10 and the through hole 12 are located between the two passages 14. The end 31 of the axle 30 is firmly positioned by four tubular members 21 in two opposite directions. This ensures that the axle 30 and the crank 10 are assembled as a one-piece member.

While we have shown and described the embodiment in accordance with the present invention, it should be clear to those skilled in the art that further embodiments may be made without departing from the scope of the present invention.

What is claimed is:

1. A combination of a crank and an axle, wherein the crank includes a through hole defined in a first end thereof and a threaded hole is defined in a second end of the crank, a passage is defined through the crank and communicates with the through hole;

the axle is adapted to be received in a bottom bracket and one of two ends of the axle is engaged with the through hole of the crank, and a positioning assembly including two tubular members which are received in the passage and each tubular member having a concave surface which contacts the axle in the through hole, a bolt threadedly extending through the two tubular members.

2. The assembly as claimed in claim 1, wherein the through hole includes ridges and grooves defined in an inner periphery thereof and the end of the axle that is engaged with the through hole has ridges and grooves defined in an outer periphery thereof.

3. A combination of a crank and an axle, wherein the crank includes a through hole defined in a first end thereof and a threaded hole is defined in a second end of the crank, two passages are defined through the crank and communicates with the through hole which are located between the two passages;

the axle is adapted to be received in a bottom bracket and one of two ends of the axle is engaged with the through hole of the crank, and two sets of positioning assembly and each set of the positioning assembly including two tubular members which are received in respective one of the two passages, each tubular member having a concave surface which contacts the axle in the through hole, a bolt threadedly extending through the two tubular members.

4. The assembly as claimed in claim 3, wherein the through hole includes ridges and grooves defined in an inner periphery thereof and the end of the axle that is engaged with the through hole has ridges and grooves defined in an outer periphery thereof.

* * * * *